(12) United States Patent
Maroney

(10) Patent No.: US 9,785,203 B1
(45) Date of Patent: Oct. 10, 2017

(54) FLEX CABLE INTERFACE

(71) Applicant: Western Digital Technologies, Inc., Irvine, CA (US)

(72) Inventor: John E. Maroney, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 235 days.

(21) Appl. No.: 14/633,102

(22) Filed: Feb. 26, 2015

(51) Int. Cl.
G06F 13/00 (2006.01)
G06F 1/18 (2006.01)

(52) U.S. Cl.
CPC .............. *G06F 1/181* (2013.01); *G06F 1/183* (2013.01)

(58) Field of Classification Search
None
See application file for complete search history.

(56) References Cited

U.S. PATENT DOCUMENTS

| | | | |
|---|---|---|---|
| 7,249,955 B2 | 7/2007 | Horine et al. | |
| 7,701,705 B1 | 4/2010 | Szeremeta | |
| 8,064,194 B2 | 11/2011 | Szeremeta | |
| 8,113,873 B1 | 2/2012 | Sarraf | |
| 8,133,426 B1 | 3/2012 | Yurchenco et al. | |
| 8,358,395 B1 | 1/2013 | Szeremeta | |
| 8,416,564 B2* | 4/2013 | Chang .................. | G06F 13/4063 312/223.1 |
| 8,417,979 B2 | 4/2013 | Maroney | |
| 8,462,460 B1 | 6/2013 | Szeremeta et al. | |
| 8,498,088 B1 | 7/2013 | Klein | |
| 8,547,658 B1 | 10/2013 | Szeremeta | |
| 8,715,000 B2 | 5/2014 | Zhu et al. | |
| 9,274,174 B2* | 3/2016 | Waltermann ... | G01R 31/318536 |
| 2011/0061933 A1 | 3/2011 | Prest | |
| 2013/0076833 A1 | 3/2013 | Honglin | |
| 2014/0168926 A1 | 6/2014 | Colman | |

OTHER PUBLICATIONS

Ron White; How Computers Work; 2005; Que Publishing; 8th Edition; All Pages.*
Dell(TM) Optiplex(TM) 745 Tech Specs; 2005; Dell; All Pages.*

* cited by examiner

*Primary Examiner* — Idriss N Alrobaye
*Assistant Examiner* — Richard B Franklin
(74) *Attorney, Agent, or Firm* — Chang & Hale LLP

(57) ABSTRACT

Systems and methods are disclosed for transmitting data between printed circuit board assemblies (PCBAs) using a flexible, non-impedance-controlled data transmission cable coupled between the boards and treating the received signal with re-driver circuitry configured to boost a data signal according to a communication interface standard.

20 Claims, 6 Drawing Sheets

FLEX CABLE INTERFACE

BACKGROUND

Electronic devices may comprise one or more printed circuit board assemblies (PCBAs) or other collections of circuitry and/or computer components. Communication between such boards/collections may be achieved in various ways.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to data transmission between components of a computing system.

Overview

Computing devices and/or systems often include a primary, or main, controller printed circuit board assembly (PCBA) as well as one or more secondary PCBAs. The terms PCBA, "board," "controller" and/or other related terms are used herein according to their broad and ordinary meaning, and may reference circuitry or collections of circuitry and/or computing modules on a single physical board or combined in a logical or physical partition of some kind, or may refer to the physical boards themselves and/or circuit dies, chips, and the like.

Figure 1:
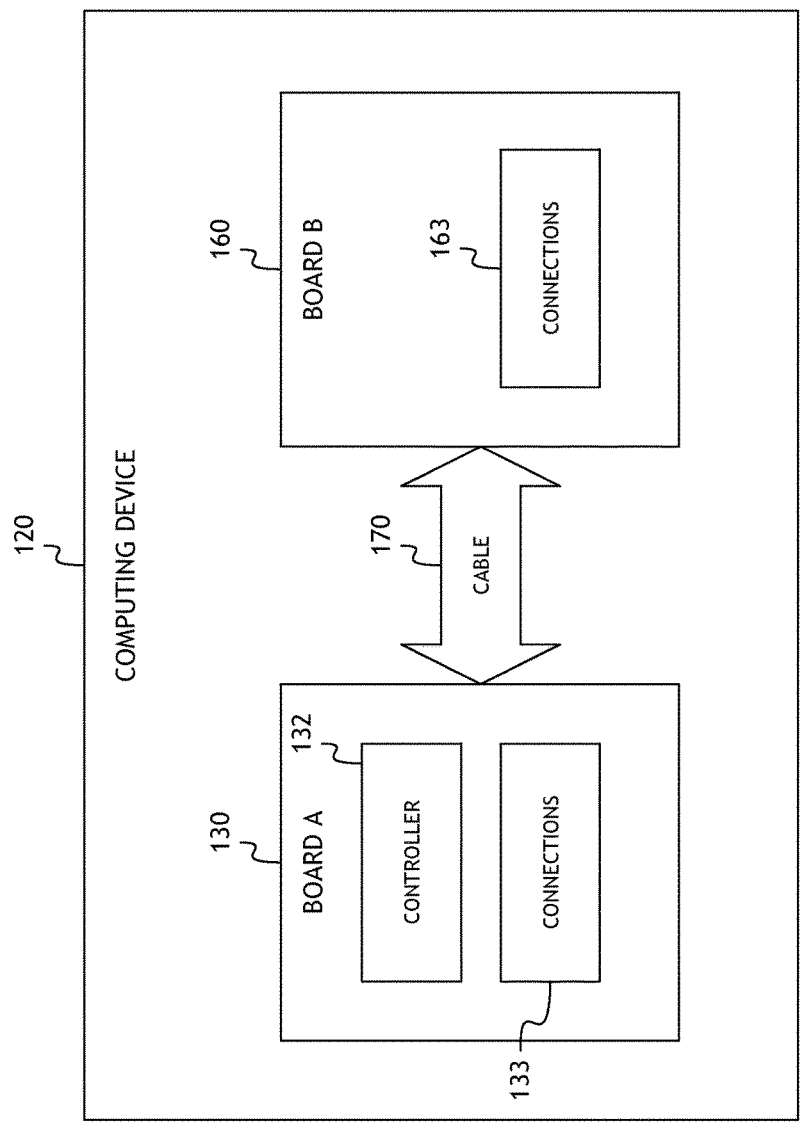
FIG. 1 is a block diagram of a computing device according to one or more embodiments.

FIG. 1 is a block diagram of a computing device 120 according to one or more embodiments. In certain embodiments, the computing device 120 includes a first board 130 (Board A), which may comprise, for example, a controller 132 comprising a controller processor, as well as one or more data transmission and/or other types of connections, such as system busses, and the like. The board 130 may further include one or more interface controllers, and/or other system components, as well as various physical data/power connection ports, such as Universal Serial Bus (USB) ports or the like (e.g., USB port(s)). USB ports, interfaces and/or technologies disclosed herein may correspond to any USB protocol, such as USB 2.0, USB 3.0, USB 3.1, or any other USB standard.

In certain embodiments, one or more USB or other data and/or power communication ports may be components of, or in data/power communication with, one or more secondary boards, such as Board B 160. In order to provide data and/or power communication between the primary board 130 and the secondary board 160, various connections and/or busses may be used. For example, computing device 120 may include a dual-row (e.g, 20-pin) header structure connected over a bus conforming to a communication interface standard (e.g., USB 3.x) to the controller 132 on the main controller board 130. The header structure (not shown) may be connected directly to a communication interface port (e.g., USB) on a front panel of the computing device 120. Alternatively or additionally, certain embodiments may employ an extension cable that is impedance-controlled, such as a discrete custom-molded round shielded cable, or flex cable including a ground plane reference. Such a cable may be used to connect the main controller board 130 to the secondary board (e.g., front panel board). However, such solutions may be relatively expensive to manufacture and/or produce.

Disclosed herein are certain relatively low-cost systems and methods for connecting a main controller board to a secondary board (e.g., front panel USB3.x port) in a computing system. Certain embodiments provide a non-impedance-controlled, relatively low-cost flexible cable (i.e., "flex cable"), which may be used for connecting a main controller board to a secondary board (e.g., a front panel board), wherein signal re-driver circuitry (e.g., a USB re-driver module) is used to compensate for signal loss, which may be experienced in sufficiently high-frequency applications (e.g., 2.5 Ghz to 5 Ghz), wherein such signal loss may be attributable at least in part to the non-impedance-controlled characteristics of the cable.

Data Storage System

Figure 2:
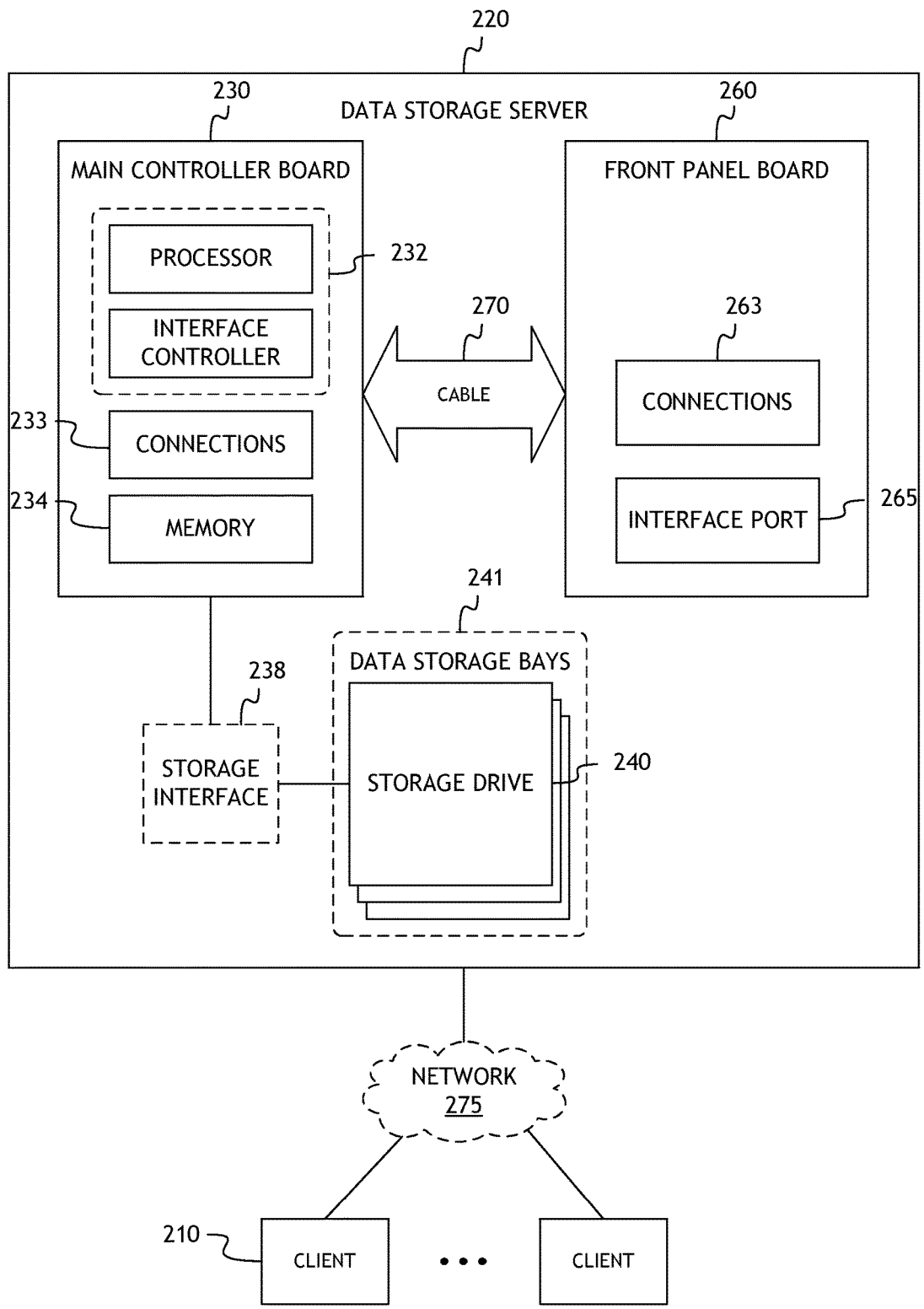
FIG. 2 is a block diagram of a data storage server according to one or more embodiments.

In certain embodiments, a data storage server device or system may implement data communication bridging between separate boards or regions of the device/system using a data transmission cable or the like. FIG. 2 is a block diagram of a data storage server providing data transmission over a cable in accordance with one or more embodiments. The storage server 220 may comprise a box or housing at least partially containing one or more of the illustrated features or components. The server 220 includes a main controller board 230 configured to hold the controller 232, including at least one controller processor, as well as possibly a communication interface controller for one or more communication interfaces. The main board 230 further includes system busses and/or other connections 233, as well as other system components, physical data/power connection ports (such as USB ports), and/or other components or features. In addition to the main controller board 230, the storage server 220 further includes a secondary board 360, illustrated as a front panel board. Although a front panel board is illustrated, it should be understood that the board 260 may correspond to any type of secondary board, backplane or partition of circuitry and/or ports or connections within the data storage server system 220.

The storage server 220 may further include one or more backplane modules (not shown), and one or more storage drives or storage devices 240. As shown, the controller board 230 of the storage server 220 may be coupled to a storage interface 238, such as a Serial ATA (SATA), Serial attached SCSI (SAS), Peripheral Component Interconnect (PCI), PCI Express (PCIe), or other type of storage interface. The storage interface 238 may be configured, according to one embodiment, as an extensible drive interface configured to implement a serial addressing scheme to access the storage drive(s) 240. The storage interface 238 may be configured to deliver power signals and storage protocol signals from the controller board, such as signals provided by an on-board bus-specific controller.

The controller board 230 further comprises system memory 234, which may provide main memory for the storage server 220. For example, the memory 234 may be configured to store data and instructions for executing programs/processes by the processor. The memory 234 may further provide system cache, wherein the memory is used at least in part for relatively fast data storage access to relatively important and/or recently-used data and instructions. The memory may be any suitable size, such as 256 GB, 2 GB, 4 GB, 8 GB, or more. In certain embodiments, the memory 234 is volatile solid-state memory. As used in this application, "volatile solid-state memory," "volatile memory," "semiconductor memory," or variations thereof may refer to solid-state memory such as dynamic random access memory (DRAM) or static random access memory (SRAM). However, the systems and methods of this disclosure may also be useful in connection with other types of solid-state memory. Solid-state memory may comprise a wide variety of technologies, such as flash integrated circuits, Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), MRAM, or other discrete NVM (non-volatile solid-state memory) chips.

The architecture of FIG. 2 may be extended to different numbers of drives in different configurations. For example, the storage server 220 may include any number of rack unit storage bays 241 for receiving the storage drives 240, such as 2, 4, 8, or more bays. The storage drives 240 can have various types of storage media, such as HDD, SSD, or a hybrid of both.

The system of FIG. 2 further includes one or more client devices or systems 210 that may be configured to access the storage server 220 over a computer network 275, such as a local area network (LAN) or a wide area network (WAN), such as the Internet. The storage server 220 may provide data storage services to the clients 220. Furthermore, the one or more client devices 210 may be configurable to directly access the data storage server 220 over, for example, a wired connection (e.g., USB), or a wireless connection (e.g., Bluetooth, WiFi).

The devices/systems of FIGS. 1 and 2 represent configurations in which communication between a plurality of boards in a device/system may be achieved at least in part using a data transmission cable connected between the plurality of boards. Although data integrity may be preserved in certain embodiments in which high-quality impedance-controlled transmission cables are used, due to cost and other considerations, such cables may be undesirable or impractical in certain devices or systems.

Accordingly, certain embodiments disclosed herein provide for the use of non-impedance-controlled flex cables to connect a secondary board (e.g., front panel board) to the main controller board. However, use of such non-impedance-controlled cables may introduce channel losses and/or distortion in data signals transmitted thereon. In order to compensate for such losses, certain embodiments further provide a re-driver module or circuitry that may be used, for example, at the secondary board and/or main controller board to re-generate the signal and boost the signal quality. The re-driver circuitry may be configured to adjust and/or correct for known channel losses introduced by the non-impedance-controlled (e.g., slightly un-matched impedance) flex cable, thereby restoring signal integrity at least in part.

Re-driver modules/circuitry, which may be referred to as repeater ICs, may generally be configured to regenerate signals to boost the signal quality of, for example, high-speed interfaces. Generally, relatively faster signal frequencies allow for less signal margin in which to design reliable, high-performance systems. Using equalization, pre-emphasis, and/or other technologies, a single re-driver may be configured to adjust and correct for known channel losses at the transmitter (e.g., main controller board) and restore signal integrity at the receiver (e.g., secondary board).

Figure 3:
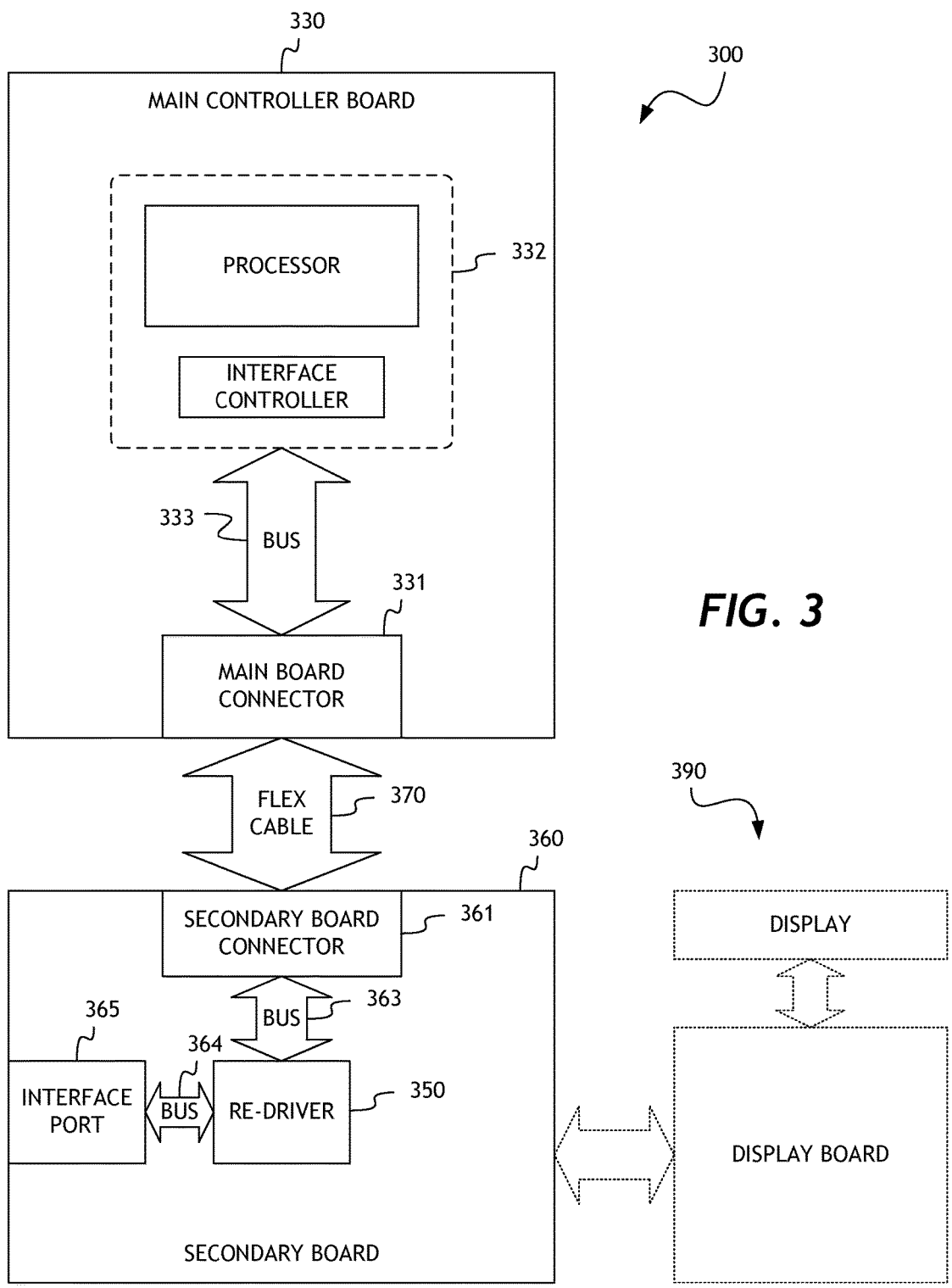
FIG. 3 is a block diagram of a computing system according to one or more embodiments.

FIG. 3 is a block diagram of a computing system according to one or more embodiments. In certain embodiments, the system 300 of FIG. 3 provides a relatively low-cost scheme for connecting a communication interface port (e.g., USB) associated with a secondary board 360 to a main controller board 330 using a non-impedance-controlled, relatively low-cost flexible cable 370, wherein re-driver circuitry 350 (e.g., USB 3.x re-driver module) is used to compensate for signal loss introduced by the non-impedance-controlled nature of the cable 370.

The costs associated with manufacturing and production of flexible, non-impedance-controlled cables may be substantially less than those associated with impedance-controlled cables. For example, impedance-controlled cables may cost approximately ten times, or more, that of non-impedance-controlled cables in certain situations. The additional costs in impedance-controlled cables may be associated with the inclusion of a ground plane or reference as part of the cable. In addition, the flexible nature of the cable 370 may allow for accommodation of various physical layouts of the main controller board 330 and the secondary board 360 with respect to one another, which may depend in part on the shape and or structure of a housing in which the boards are at least partially contained. Depending on the physical layout and/or other considerations, use of separate primary and secondary boards coupled by a flexible cable may provide cost and/or implementation advantages over combining the features of the boards in a single, likely considerably larger, board, which may be physically impractical or impossible in certain device configurations.

FIG. 3 includes a main controller board 330, which may represent an embodiment of the controller board 230 of FIG. 2 or the board 130 of FIG. 1. The controller board 330 includes a controller chip 332, including a processor and possibly interface controller circuitry. The interface controller may be a native host controller, which may not need to be connected to the processor via a system bus (e.g., PCIe); the interface controller may be a native port of the controller system on a chip (SOC). Alternatively, the interface controller may be a separate host controller that is not part of the controller SOC. It should be understood that a controller board designed according to principles disclosed herein may comprise more, fewer, and/or different types and/or quantities of components compared to the controller board 330 illustrated in FIG. 3.

A relatively low-cost flex cable 370 may be configured to connect the main controller board 330 to the front panel board 360. In certain embodiments, the flex cable 370 does not conform to the data communication standard that is associated with the interface controller of the controller 332, bus 333, bus 363, and/or interface port 365. For example, in a USB communication environment, the flex cable 370 may not be a USB standard cable; the cable 370 is rather a non-impedance-controlled cable comprising a plurality of parallel pins. The flex cable 370 may be, for example, a 40-pin cable approximately 6-8 inches in length, or of some other length appropriate for bridging between the main controller board 330 and secondary board 360. In certain embodiments, the flex cable 370 includes one or more substantially flat copper wires adhered to an at least partially flexible substrate that is molded into a cable-like form, wherein the cable 370 does not include a ground plane or other effective ground reference.

In certain embodiments, the flex cable 370 may be shared by one or more other system processes or signals (e.g., LED). With respect to a USB implementation, the USB process may utilize transmit and receive pairs of the cable for data communication, leaving one or more remaining parallel lines for other uses when the flex cable 370 comprises more than four parallel lines in total.

The secondary board 360 may be associated with a front panel of a data storage device or other computing device. The secondary board 360 may include one or more physical connector structures, which may be, for example, zero insertion force (ZIF) connectors. The secondary board 360 further includes re-driver circuitry 35, which may serve to compensate for losses, as described above. The re-driver circuitry may be a single chip, multiple chips, or any other structure or configuration. The re-driver circuitry 350 may advantageously be disposed on the secondary board 360 in relatively close physical proximity to the secondary board connector 361, over-which the signal to be treated is received by the secondary board 360 from the main board 330 via the flex cable 370. The re-driver circuitry may be configured to provide signal repeating, re-equalization, retiming and/or other signal processing functionality.

Although not illustrated, it should be understood that the main controller board 330 may likewise comprise re-driver circuitry disposed along the transmission path between the secondary board and the controller 332, which may serve to compensate for signal losses introduced during transmission over the flex cable 370 from the secondary board to the main board. For example, data received by the main board over the flex cable may be passed from the main board connector 331 to re-driver circuitry over a bus, and from the re-driver circuitry to the controller 332 over the bus 333.

Data Flow

Figure 4:
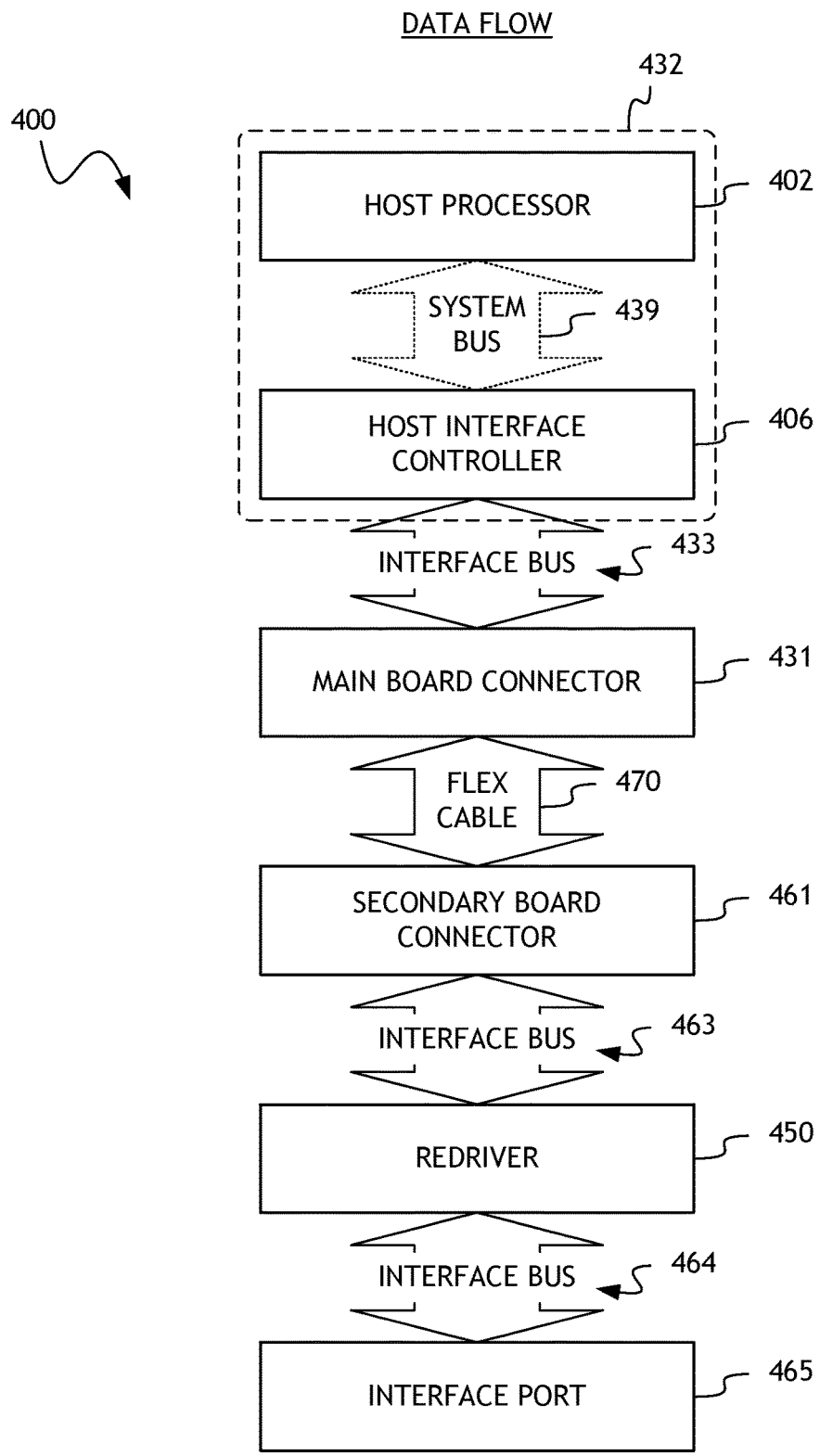
FIG. 4 is a flow diagram illustrating data flow between components of a computing system.

FIG. 4 is a flow diagram illustrating data flow 400 between components of a computing system. FIG. 4 shows the flow of data between a host processor 402 and an interface port 465. Although the flow 400 generally is discussed herein in the context of data transmission originating at the host processor 402 and terminating at the interface port 465, it should be understood that principles disclosed herein may be applicable likewise to data and/or power transmission in the reverse direction as well as. That is, transmission originating at the interface port and terminating at the host processor 402 is likewise contemplated herein.

The host processor 402 may be a component of a controller 432 which may be disposed on or associated with a printed circuit board assembly (PCBA), which may be referred to herein as a main controller board. The controller 432 includes the host processor and may further include host interface controller circuitry 406. For example, the host processor 402 and the host interface controller 406 may be components of a single chip, such as a system on a chip (SOC). Alternatively, the host processor 402 may be connected to the host interface controller 406 over a system bus, such as a PCIe bus. In such a configuration, the host interface controller 406 may not be part of the same chip as the host processor 402.

The host interface controller 406 may provide functionality for translating data from the host processor to a data communication standard associated with an interface bus 433 connected thereto. The interface bus 433 may be any type of communication bus conforming to one or more data communication protocols or standards. Various example communication interfaces are disclosed herein, such as USB, PCIe, thunderbolt, and/or other types of communication interface standards. An embodiment in which the interface bus 433 corresponds to a USB bus is disclosed in connection with FIG. 5 and described below.

The interface bus 433 communicatively couples the host interface controller 406 with a mainboard connector 431. The main board connector may comprise a physical structure providing a physical interface for connecting one or more transmission lines of the main controller board to one or more external connectors or transmission lines. For example, the mainboard connector 431 may comprise a physical connection port for mating with a corresponding connector associated with a flex cable 470, thereby allowing for data communication between the main controller board and the flex cable 470 through the mainboard connector 431 and possibly through a corresponding physical connector of the flex cable 470 which may be matingly engaged with the mainboard connector 431.

At a second end of the flex cable, the flex cable 470 may be connected to a connector of a secondary board 461. For example, a physical connection structure at the second end of the flex cable may be configured to be matingly engaged with the secondary board connector 461 in such a manner as to allow for electrical communication between the flex cable and the secondary board connector, which is part of, or associated with, a secondary board that is separate from the main controller board.

The signal received from the flex cable over the secondary board connector 461 by the secondary board may have integrity or corruption issues in certain embodiments where the flex cable 470 is a non-impedance-controlled cable, as described above. That is, data signals received by the secondary board from the flex cable 470 via the secondary board connector 461 may experience compromised signal integrity based at least in part on the non-impedance-controlled characteristic of the flex cable 470. In order to compensate for such signal integrity issues, the flow process 400 involves providing the received signal to re-driver circuitry 450 associated with the secondary board. For example, such signal may be passed to the re-driver circuitry 450 over an interface bus 463 that conforms to the communication interface associated with the host interface controller 406.

The re-driver circuitry 450 may be configured to perform various signal processing operations on the signal to thereby improve the signal integrity before passing the signal to an interface port 465 associated with the secondary board. The interface port may be a physical connection port conforming to the communication interface associated with the re-driver 450 interface busses 463 and 464, interface bus 433, and/or the host interface controller 406. For example, the relevant communication interface may be a USB interface, which is described in greater detail below in connection with FIG. 5.

The signal may be transmitted between the re-driver circuitry 450 and the interface port 465 over the interface bus 464.

The interface port 465 may be connected to, or associated with, a front panel of a computing device, as described above. In certain embodiments, the interface port 465 allows for an external device to be plugged into the interface port, thereby allowing communication between the external device and the host processor according to the data flow represented in FIG. 4.

Figure 5:
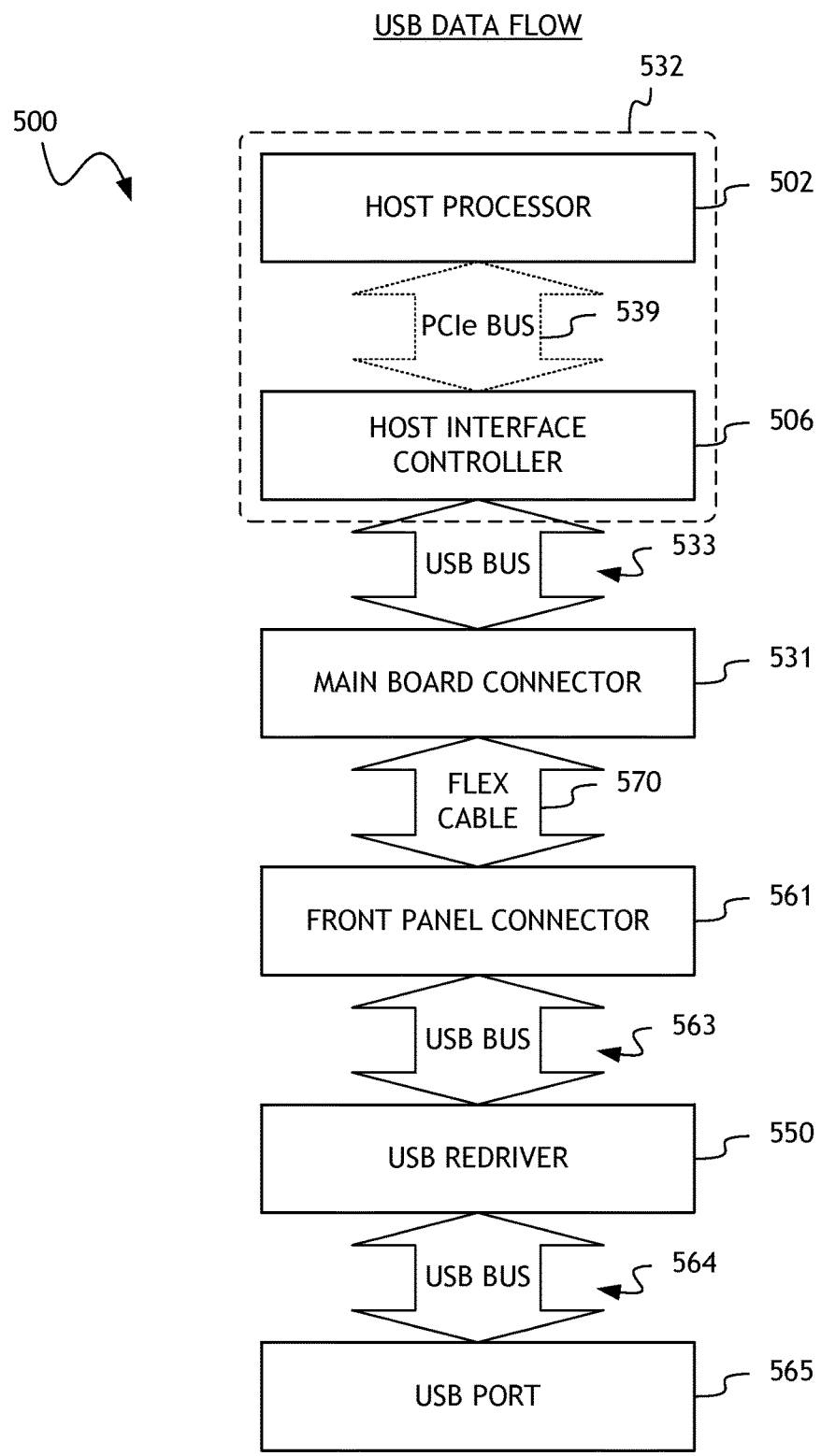
FIG. 5 is a flow diagram illustrating data flow between components of a computing system.

FIG. 5 is a flow diagram illustrating data flow between components of a computing system. The process 500 illustrated in FIG. 5 represents a data flow 500 that may be similar in certain respects to that disclosed above in connection with FIG. 4. Therefore, for simplicity, certain aspects of the data flow 500 may not be discussed in detail herein, while certain details may be emphasized for the purpose of illustrating particular features or aspects of the flow 500.

The host processor 502 may be connected to a host USB controller (e.g., USB) via a PCIe bus 539. Alternatively, the host processor 502 and host USB controller 506 may be part of a single controller SOC 532. In certain embodiments, the host USB controller 506 converts the PCIe signal to a USB signal. The host USB controller may then pass the signal to a connector of the main board (e.g., a front panel connector port on the main controller board) over a USB bus 533 connection.

The signal may further be passed through a flex cable 570 into a front panel board connection port 561. At the front panel board, the signal may be provided to re-driver circuitry 550 (e.g., a re-driver chip) that is configured to condition the signal and pass the signal over a USB bus to a USB port on the front panel of the computing device with which the main board and front panel board are associated.

Figure 6:
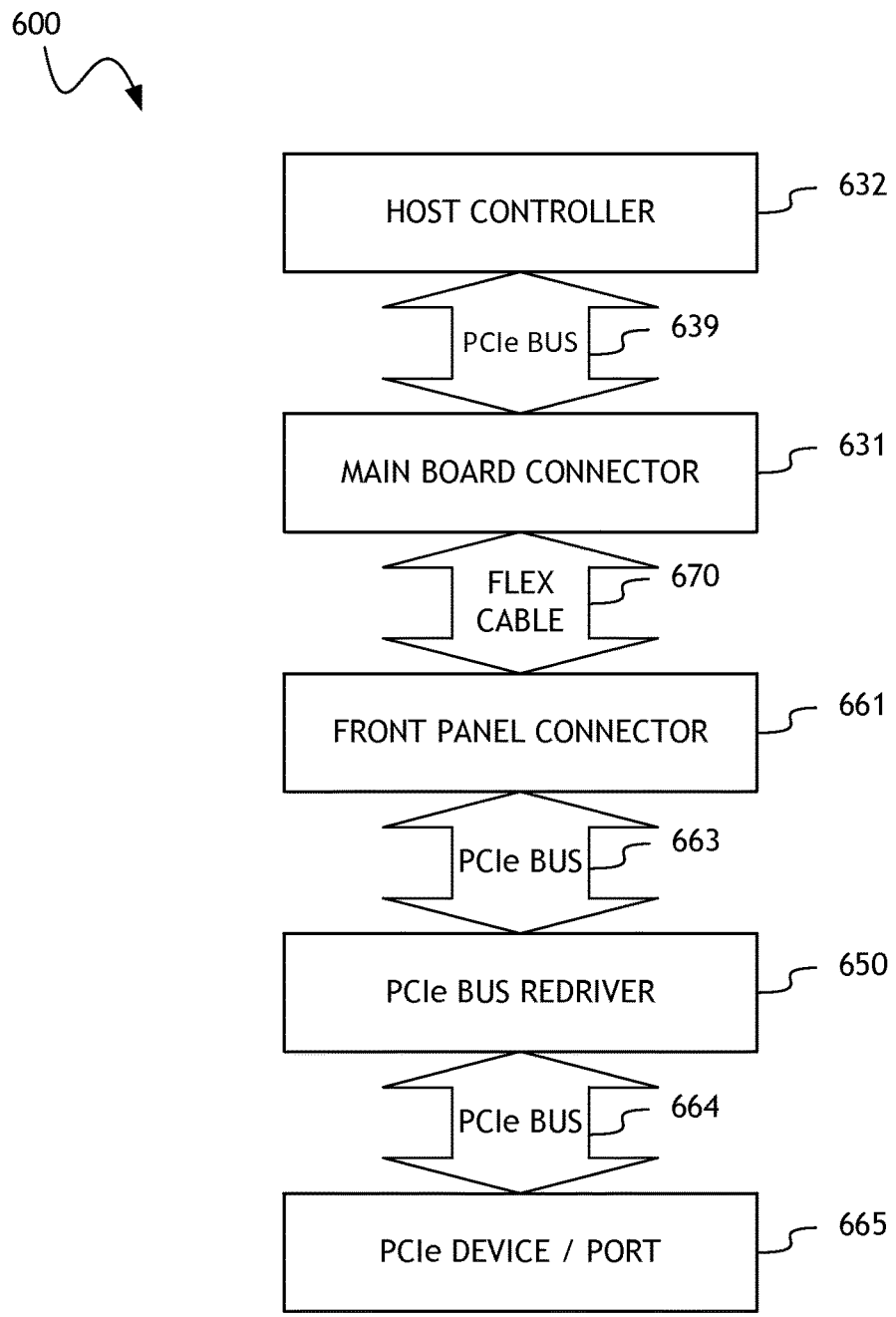
FIG. 6 is a flow diagram illustrating data flow between components of a computing system.

FIG. 6 is a flow diagram illustrating data flow between components of a computing system. The process 600 illustrates data flow between a host controller 632 of a main controller board and a PCIe device 665 connected to a secondary board. The process 600 provides for carrying a PCIe bus to, for example, an extension card using a non-impedance-controlled flex cable. The flow 600 includes using PCIe bus re-driver circuitry 650 to re-drive a PCIe bus (e.g., bi-4, bi-2 PCIe bus).

In certain embodiments, data flows from the host controller 632 to, for example, an edge connector/finger 631, or other connector structure. The connector may be configured to plug into the main board, or may plugs into a slot associated with the board. The flex cable 670 may be configured to be plugged into the main board connector 631. The secondary board (e.g., front panel board) may receive the signal from the flex cable 670 over a connector 661, and pass the signal to the PCIe bus re-driver circuitry over a PCIe bus 663. The signal, once operated on by the re-driver circuitry 650, may be passed to a PCIe adapter, card, or other PCIe device or port 665. In certain embodiments, the PCIe device or port 665 may be used for dual 10 Gb Ethernet, dual Gb Ethernet, SAS, USB 3.1, Thunderbolt, or other communication interface that the system may not otherwise be able to accommodate.

ADDITIONAL EMBODIMENTS

Those skilled in the art will appreciate that in some embodiments, other types of data transmission systems and methods can be implemented while remaining within the scope of the present disclosure. In addition, the actual steps taken in the processes discussed herein may differ from those described or shown in the figures. Depending on the embodiment, certain of the steps described above may be removed, and/or others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A computing device comprising:
   a first printed circuit board assembly (PCBA) comprising:
      a processor;
      interface controller circuitry associated with a communication interface;
      a first physical connector structure; and
      a first interface bus configured to communicatively couple the interface controller circuitry to the physical connector structure according to the communication interface;
   a second PCBA comprising:
      a second physical connector structure;
      first re-driver circuitry configured to boost a data signal according to the communication interface;
      a second interface bus configured to communicatively couple the second physical connector structure to the first re-driver circuitry; and
   a flexible, non-impedance-controlled data transmission cable that does not include a ground reference coupled to the first physical connector structure at a first end and to the second physical connector structure at a second end; wherein the first re-driver circuitry is configured to compensate for signal loss introduced by a non-impedance-controlled nature of the data transmission cable.

2. The computing device of claim 1, further comprising:
   a housing configured to at least partially house the first PCBA and the second PCBA, the housing including a front panel; and an interface port configured to receive an interface connector associated with the communication interface, the interface port being physically coupled to the second PCBA;

wherein the interface port is accessible via an aperture in the front panel.

3. The computing device of claim 1, wherein the communication interface is a Universal Serial Bus (USB) interface.

4. The computing device of claim 1, wherein the communication interface is a Peripheral Component Interconnect Express (PCIe) interface.

5. The computing device of claim 1, wherein the first PCBA further comprises second re-driver circuitry that is configured to at least partially compensate for signal loss introduced by the non-impedance-controlled nature of the data transmission cable for signals transmitted from the second PCBA to the first PCBA.

6. The computing device of claim 1, wherein the data transmission cable comprises at least 40 parallel transmission lines.

7. The computing device of claim 1, wherein the computing device is a data storage server device comprising a plurality of bays configured to receive a plurality of data storage devices.

8. A printed circuit board assembly (PCBA) comprising:
a physical connector structure;
re-driver circuitry configured to boost a data signal according to a communication interface;
an interface bus configured to communicatively couple the second physical connector structure to the re-driver circuitry; and
a physical interface port conforming to the communication interface;
wherein: the PCBA is configured to receive the data signal over a flexible, non-impedance-controlled data transmission cable that does not include a ground reference coupled to the physical connector structure and boost the data signal using the re-driver circuitry; and the re-driver circuitry is configured to compensate for signal loss introduced by a non-impedance-controlled nature of the data transmission cable.

9. The PCBA of claim 8, wherein the PCBA is further configured to receive the data signal from a separate PCBA coupled to the data transmission cable.

10. The PCBA of claim 9, wherein the PCBA is a front panel board assembly of a data storage server device and the separate PCBA is a main controller board of the data storage server device.

11. The PCBA of claim 8, wherein: the PCBA is at least partially contained within a physical housing, the physical housing including a front panel; and the physical interface port is accessible via an aperture in the front panel.

12. The PCBA of claim 8, wherein the communication interface is a Universal Serial Bus (USB) interface.

13. The PCBA of claim 8, wherein the communication interface is a Peripheral Component Interconnect Express (PCIe) interface.

14. The PCBA of claim 8, wherein the re-driver circuitry is further configured to at least partially compensate for signal loss introduced by the data transmission cable.

15. A method of processing data, the method comprising:
generating a data signal using a processor and interface controller circuitry of a first printed circuit board assembly (PCBA), the interface controller circuitry being associated with a communication interface;
transmitting the data signal to a first physical connector structure of the first PCBA over a first interface bus conforming to the communication interface;
transmitting the data signal to a second PCBA over a flexible, non-impedance-controlled data transmission cable that does not include a ground reference coupled to the first physical connector structure at a first end and to a second physical connector structure of a second PCBA at a second end;
providing the data signal to re-driver circuitry of the second PCBA over a second interface bus conforming to the communication interface; and
compensating for signal loss in the data signal attributable to a non-impedance-controlled nature of the data transmission cable using the re-driver circuitry of the second PCBA.

16. The method of claim 15, further comprising providing the data signal over an interface port configured to receive an interface connector associated with the communication interface, the interface port being physically coupled to the second PCBA.

17. The method of claim 15, wherein the first PCBA and the second PCBA are at least partially contained within a housing of a data storage server device, the housing including a front panel associated with the second PCBA.

18. The method of claim 15, wherein the communication interface is a Universal Serial Bus (USB) interface or a Peripheral Component Interconnect Express (PCIe) interface.

19. The method of claim 15, further comprising: transmitting data signals from the second PCBA to the first PCBA over the data transmission cable; and compensating for signal loss introduced by attributable to the non-impedance-controlled nature of the data transmission cable using re-driver circuitry of the first PCBA.

20. The method of claim 15, wherein: said transmitting the data signal to the second PCBA over the data transmission cable comprises using a first plurality of wires of the transmission cable to transmit the data signal; and the method further comprises using a second plurality of wires of the transmission cable separate from the first plurality of wires to transmit a separate data signal, the separate data signal conforming to a separate communication interface.

* * * * *